(12) United States Patent
Dolan et al.

(10) Patent No.: US 8,443,427 B2
(45) Date of Patent: May 14, 2013

(54) METHOD AND APPARATUS FOR CONTROLLING ACCESS TO A NETWORK RESOURCE

(75) Inventors: Gerald Dolan, Melissa, TX (US); John Couchot, McKinney, TX (US); Robert Astle, Sherman, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 12/694,570

(22) Filed: Jan. 27, 2010

(65) Prior Publication Data

US 2011/0185403 A1    Jul. 28, 2011

(51) Int. Cl.
*G06F 21/00* (2006.01)
(52) U.S. Cl.
USPC .............................................................. 726/6

(58) Field of Classification Search ........................ None
See application file for complete search history.

(56) References Cited

U.S. PATENT DOCUMENTS

2007/0079356 A1* 4/2007 Grinstein ......................... 726/2
2007/0094710 A1* 4/2007 Walker et al. .................... 726/2

* cited by examiner

*Primary Examiner* — Hadi Armouche
*Assistant Examiner* — Malcolm Cribbs

(57) ABSTRACT

According to one aspect, there is provided a method of controlling access to a network resource. The method comprises receiving a request to grant a user access to the network resource, the request including a user identifier, determining whether the received user identifier is stored in a local user data store associated with the resource, and where it is not so determined determining, from user details stored in a master user data store, whether the user is authorized to access the resource, and where it is so determined obtaining a password, and storing the obtained password and user details in the local data store associated with the network resource.

17 Claims, 5 Drawing Sheets

METHOD AND APPARATUS FOR CONTROLLING ACCESS TO A NETWORK RESOURCE

BACKGROUND

Computer network security is typically of paramount importance to network operators to ensure that only authorized users are able to access network resources such as services, applications, files, data, and the like.

In many networks, the number of users authorized to access different network resources may run from a single user up to multiple millions of users.

Over time, some users may have their authorization or entitlement to access network resources withdrawn, for example when an employee leaves a company, and new users may be authorized to access network resources, for example when a person starts employment with a company. Different users may also have authorization to access different network resources within a network.

The details of which users are entitled to access which network resources are typically distributed around the network at various end-points. End-points may include, for example, directories, data stores, databases, applications, and devices within the network and are used by security systems protecting network resources to control access to those resources.

The end-points are typically provisioned with user details of the users authorized to access different network resources. An initial provisioning step is performed using one or more user data sets provided from various network systems (not shown), for example, such as human resources databases, customer databases, and the like. User details may include, for example, user identifiers, passwords, user email addresses, user telephone numbers, and other user-related data.

However, such an approach becomes complex and unwieldy to manage when the number of users is large.

BRIEF DESCRIPTION

Embodiments of the present invention will now be described, by way of non-limiting example only, with reference to the accompanying drawings, in which.

SUMMARY OF THE INVENTION

According to a first aspect, there is provided a method of controlling access to a network resource. The method comprises receiving a request to access to the network resource, the request including a user identifier, and determining whether the received user identifier is stored in a user data store associated with the resource. Where it is not so determined the method further comprises determining, from user details stored in a master user data store, whether the user is authorized to access the resource, and where it is so determined the method further comprises obtaining a password, and storing the obtained password and user details in the data store associated with the network resource.

According to second aspect, there is provided apparatus for controlling access to a network resource. The apparatus comprises a first module configured to receive a request from a network resource to grant access to a user, the request including a user identifier. The first module is further configured to request, from a second module, a provisioning status of the user identifier in a local user database associated with the network resource. The second module is configured to, upon receiving the provisioning status request, determine, from a master user database, whether the user identifier is stored in the local user database. The second module is further configured to, when it is determined that the user identifier is not stored in the local user database and where it is further determined from the master user database that the user identifier is authorized to access the network resource, to generate a password, to communicate the generated password to the user, and to store the generated password and user details in the local user database.

DETAILED DESCRIPTION

Figure 1:
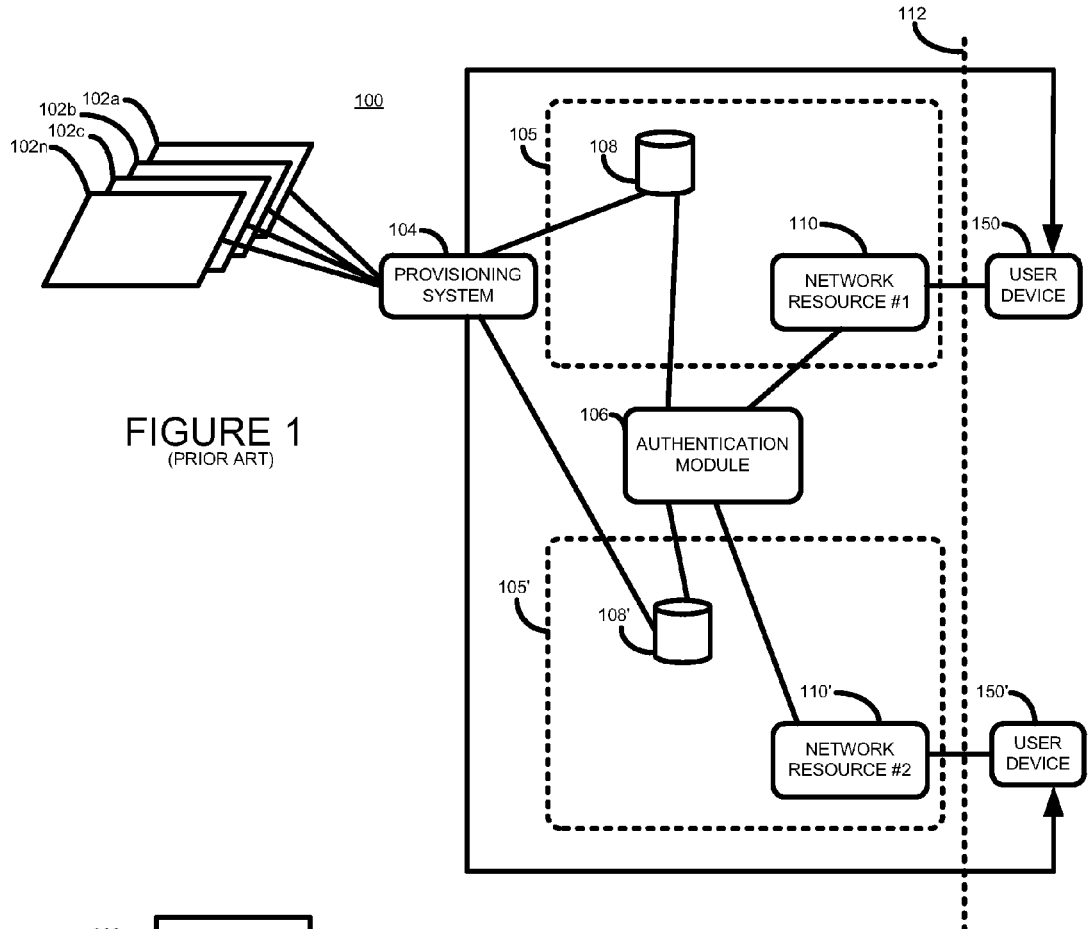
FIG. 1 is a block diagram showing a network arrangement according to the prior art.

Referring now to FIG. 1 is shown a simplified block diagram of a system 100 according to the prior art.

The system 100 comprises two end-points 105 and 105'. Those skilled in the art will appreciate, however, that other systems may comprise more or less end-points.

Each end-point (105, 105') comprises a network resource (110, 110') and a local user database (108, 108'). Each network resource may be accessed by a user device, such as user device 150. Each network resource is identified by a network resource identifier.

Where the network resource is a web-based application, the network resource 110 may be, for example, a web-application accessible at a predetermined http address. Where the network resource is a network-based application, the network resource may be, for example, a network-based application having a predetermined Internet protocol (IP) address. Those skilled in the art will appreciate that in other embodiments other types of network resources may be used.

Details of which users are authorized to access each network resource are stored in the local user database of the appropriate end-point. For example, in end-point 105 the local user database 108 stores user details of all of the users authorized to access the network resource 110.

One or more sets of authoritative user data sets 102a to 102n contain user details of each user authorized to access one or more network resources. In an enterprise environment the user data sets may be provided from various systems (not shown), for example, such as human resources databases, customer databases, and the like.

For example, user data set 102a may contain the user identifiers of all users authorized to access a network resource 110 (as shown in Table 1 below), whereas user data 102b may contain the user identifiers of all users authorized to access a network resource 110' (as shown in Table 2 below).

TABLE 1

| USER ID |
|---|
| USER #1 |
| USER #2 |
| USER #4 |
| ... |

TABLE 2

| USER ID |
|---|
| USER #1 |
| USER #3 |
| USER #4 |
| ... |

The user details in the user data sets 102a to 102n are provided to a provisioning system 104 which in turn performs a provisioning process to provision, or copy, data from the user data sets to appropriate ones of the local user databases in each end-point. The provisioning process may, for example, be a batch provisioning process, a one-off process, a recurring process, on any other suitable process, as appropriate. The user details stored in each local user database in each end-point may differ between end-points. Typically, the user details include at least a user identifier of each user entitled to access a network resource.

The provisioning system 104 additionally generates or obtains a temporary password for each user and stores the generated passwords in the appropriate local user database. An example database table stored in end-point 105 is shown below in Table 3.

TABLE 3

| USER ID | USER PASSWORD | PASSWORD EXPIRY |
|---|---|---|
| USER #1 | PASSWORD#1 | 01/01/1900 |
| USER #2 | PASSWORD#2 | 01/01/1900 |
| USER #4 | PASSWORD#4 | 01/01/1900 |

The stored passwords are used, as described below, to authenticate a user prior to granting a user access to a network resource. A password expiry field may be used to indicate whether a password has expired and needs to be changed.

The provisioning system 104 additionally communicates the generated temporary passwords to the appropriate users, for example, by sending an email to each user.

The provisioning steps described above may be performed when the network 100 is initially configured to ensure that all users authorized to access a resource are able to do so. In this case, the user data sets 102a to 102n are prepared in advance, and the provisioning process is run as an initialization process to provision all the end-points in the system. In networks having high numbers of users authorized to access network resources, this initial provisioning process may take a considerable time to complete and use substantial processing and network resources.

As new users are authorized to access network resources, or as existing users have their authorization to access network resources revoked, smaller user data sets may be processed by the provisioning system 104 to update the provisioning data stored in each end-point, as appropriate.

Once the processing of the user data sets by the provisioning system 104 has completed the prepared user data sets are deleted or removed.

Figure 2:
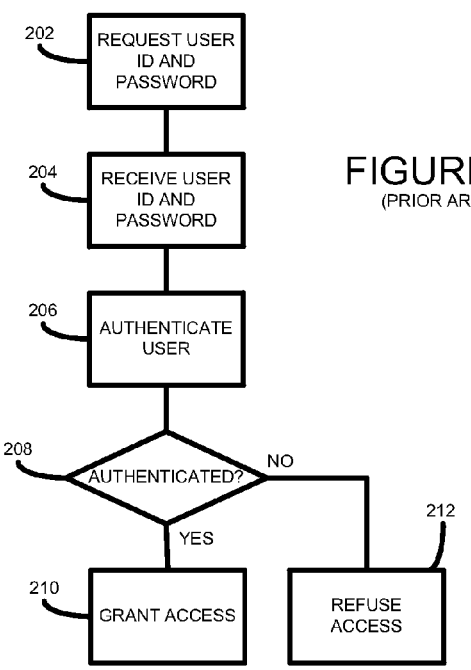
FIG. 2 is a flow diagram showing an example method performed when a user device connects to a network resource according to the prior art.

FIG. 2 is a flow diagram showing example processing actions taken by the prior art system 100 when a user device 150 connects to a network resource 110. Each network resource has a resource identifier used for identifying the resource to which access is requested.

The network resource 110 requests (202) the user of the user device 150 to enter a user identifier and password for the network resource and, in response thereto, receives (204) a user identifier and password from the user device 150. This information may be requested, for example, by way of an appropriate login page or script. The network resource 110 then performs an authentication action (206) to determine whether the identified user is authorized to access the network resource.

The authentication action (206) comprises passing the received user identifier and password, along with the resource identifier of the accessed resource, to an authentication module 106.

The authentication module 106 determines, through the local user database 108 associated with the identified resource, whether the identified user is authenticated and is allowed to access the identified resource. The identified user is authenticated if the received password matches the password stored in association with the received identifier in the local user database 108. If the received user identifier is not stored in the local user database 108 this indicates that the user identifier is not authorized to access the resource, and the authentication step will fail.

If the received and stored passwords match (208) the authentication module 106 informs (210) the network resource 110 that the identified user is authenticated and authorized to use the network resource 110. Otherwise, the authentication module 106 informs the network resource 110 that access is refused (212).

If the passwords match and the password stored in the local user database 108 is flagged as being expired, such as in the case where a temporary password was generated, the authentication module 106 may request, through the network resource, the user to enter a new password which is then stored in the local user database 108 for future authentications.

One of the problems with this approach, however, is that in many situations although a large number of users may be entitled to access network resources, only a small percentage of those users may ever actually do so.

The above-described approach, therefore, results in the storage of a potentially large number of user account details in each end-point which may never be used. This represents an important security risk, since unused accounts may be compromised without the account holders ever becoming aware.

A yet further problem is that in many situations users may access network resources only infrequently. This may result in users forgetting their password between visits, which consequently results in increased IT resources being required to deal with password reset or resending. In large organizations, this can represent a significant amount of resources being used.

Embodiments of the present invention aim to overcome, or at least alleviate, at least some of these problems.

Figure 3:
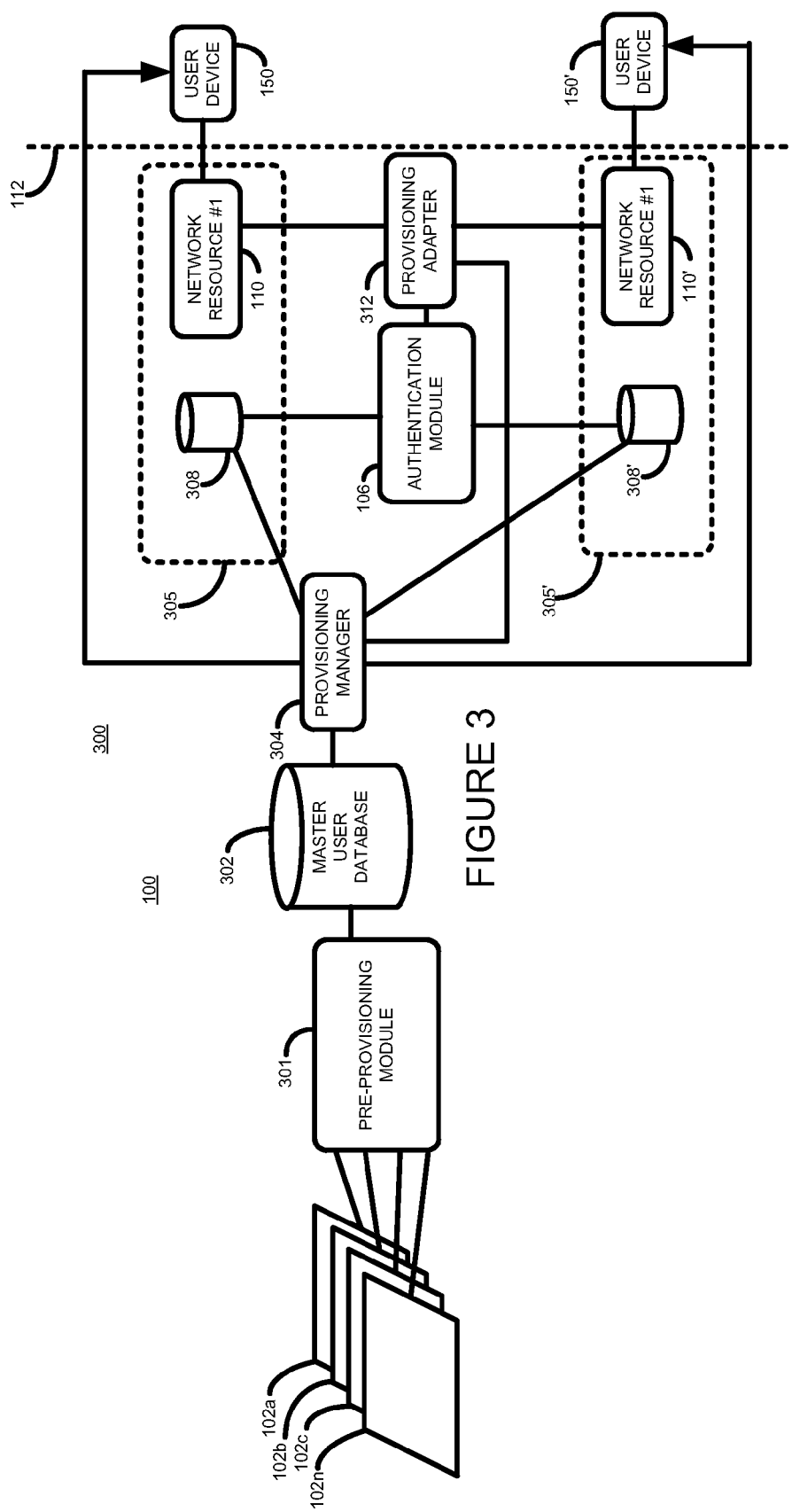
FIG. 3 is a block diagram showing a simplified block diagram of a system according to an embodiment of the present invention.

Referring now to FIG. 3 there is shown a simplified block diagram of a system 300 according to an embodiment of the present invention. It should be noted that like reference numerals within the drawings indicate like, but not necessarily identical, elements.

In the present embodiment the user data sets 102*a* to 102*n* are processed by a pre-provisioning module 301. The pre-provisioning module 301 provisions, or stores, the user data sets 102*a* to 102*n* in a consolidated form in a master user database, or data store, 302. The master user database 302 stores, for example, for each user, details of one or more resources, identified by an appropriate resource identifier, to which that user is authorized to access.

The master user database 302 also has a field to record to which end-points the user data has been provisioned, as will be explained further below. This may be done, for example, by storing the resource identifier associated with the local user database in each end-point.

An example is shown below in Table 4.

TABLE 4

| USER ID | AUTHORIZED RESOURCES | END-POINTS PROVISIONED? |
|---|---|---|
| USER #1 | RESOURCE#1 RESOURCE#2 | |
| USER #2 | RESOURCE#1 | RESOURCE#1 |
| USER #3 | RESOURCE#2 | |
| USER #4 | RESOURCE#1 RESOURCE#2 | RESOURCE#2 |

In the present embodiment, unlike in the prior art described above with reference to FIG. 1, the network end-points, such as end-point 205, are not directly provisioned with user data from the user data sets 102*a* to 102*n*, as will be described below in further detail with further reference to FIGS. 3 and 4.

Note that for clarity FIG. 3 shows only two end-points 305 and 305' however, those skilled in the art will appreciate that the system 300 may include many more end-points depending on particular configurations.

When a user device 150 connects to a network resource, such as the network resource 110, the network resource 110 requests (202) the user of the user device 150 to provide a user identifier. The network resource 110 also requests the user to enter their password for the network resource, if known. The user identifier and password may, for example, be entered by a user of the user device via a suitable user interface thereon. A user may not know their password if, for instance, their user details have not previously been provisioned to the end-point 305 or because they have forgotten it.

The network resource 110 receives (204) the provided user identifier and password, if provided, and proceeds to authenticate the access request via the authentication module 106.

However, in the present embodiment, a provisioning adapter 312 is arranged to intercept authentication requests from the network resource 110 instead of the authentication requests being received directly by the authentication module 106. The provisioning adapter 312, therefore, appears transparent to the network resource 110 and to the authentication module 106. This transparency may be achieved, for example, by having the provisioning adapter 312 mimic the interfaces between the network resource 110 and the authentication module 106.

Figure 4:
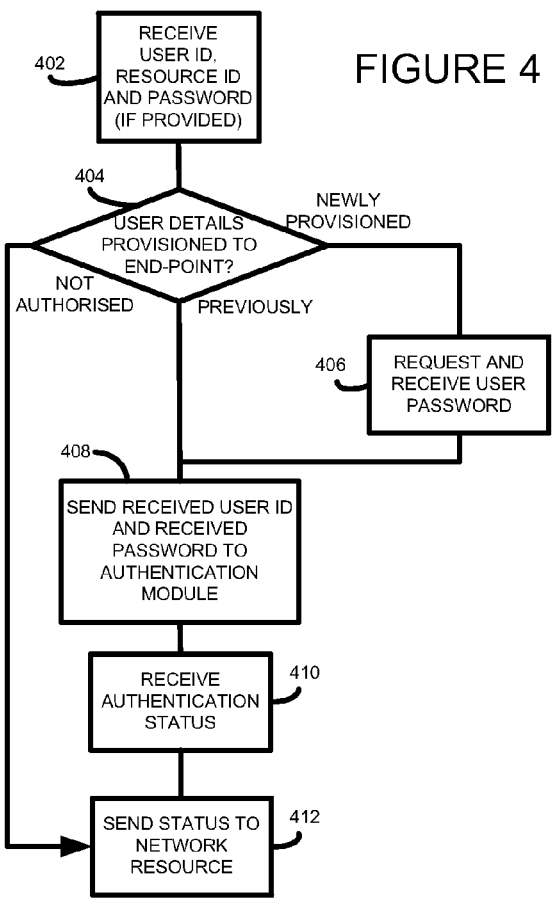
FIG. 4 is a flow diagram outlining an example method performed by a provisioning module according to an embodiment of the present invention.
Figure 5:
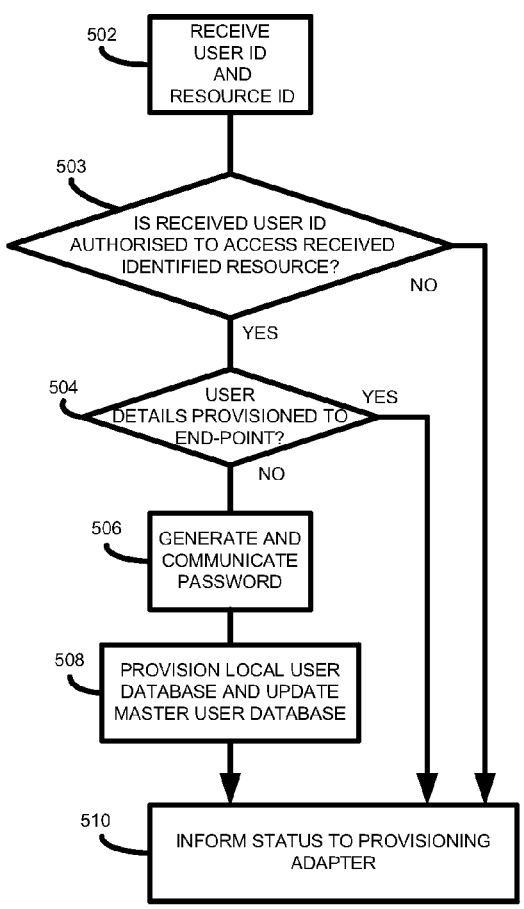
FIG. 5 is a flow diagram outlining an example method performed by a provisioning manager according to an embodiment of the present invention.

Referring now to FIG. 4, the provisioning adapter 312 receives (402), from the network resource 110, the user identifier, password (if any), and a resource identifier identifying the network resource 110.

At step 404 the provisioning adapter 312 determines the provisioning status of the received identifier, as described further below. This is performed by sending the received user identifier and the received resource identifier to the provisioning manager 304, and receiving the provisioning status therefrom.

The provisioning manager 304 receives (502) the user identifier from the provisioning adapter 312 and determines (503) from the master user database 302 whether the received user identifier is authorized to access the identified resource. The provisioning manager 304 may determine whether the received user identifier is authorized to access the identified resource by, for example, suitably interrogating the master user database 302 to determine whether the received user identifier is stored therein.

If it is determined that the received user identifier is not authorized to access the identified resource, the provisioning adapter is informed accordingly (510).

If it is determined that the received user identifier is authorized to access the identified resource, it is further determined (504) from the master user database 302 whether the local user database associated with the identified resource has been provisioned with the received user identifier. If it is determined that the user identifier has been previously provisioned to the local user database associated with the received resource identifier, the provisioning adapter is informed (510) accordingly.

The determination of whether a received user identifier has been previously provisioned to the local user database associated with the received resource identifier is made using the previously described field provided for in the master user database 302.

If the provisioning manager 304 determines (504) that the user details have not been provisioned to the appropriate end-point, the provisioning manager 304 generates (506) a password, such as a temporary password, and communicates the generated password to the identified user.

The generated password may be communicated to the identified user using, for example, email, a telephone call, a short message system (SMS) message, through a web pages, or in any other appropriate manner. The provisioning manger 304 may, for example, obtain the address to which to communicate the generated password from the user details of the identified user stored in the master user database 302.

The provisioning manager 304 then provisions, or stores in, (508) the appropriate local user database with user details associated with the received user identifier. The user details include at least the received user identifier and generated password. Additionally, the provisioning manager 304 updates the master user database 302 indicating that the user details have been provisioned to the appropriate end-point, for example by storing the address or identifier of the end-point in the master user database 302. At 510, the provisioning manager 304 informs the provisioning adapter 312 that the user details have been newly provisioned.

If the provisioning adapter 312 is informed (404) that the received user identifier is not authorized to access the identified resource the network resource 110 is informed (412).

If the provisioning adapter 312 is informed (404) that user details corresponding to the received user identifier have been newly provisioned to the end-point 305 by the provisioning manager 304 the provisioning adapter requests, for example through the network resource 110, the user to enter a password. When the user enters the password it is received (406) by the provisioning adapter 312.

If the provisioning adapter 312 is informed (404) that the user details corresponding to the received user identifier have been previously provisioned to the end-point 305 by the provisioning manager 304 the process continues (408).

At 408, the received user identifier and password are sent by the provisioning adapter 312 to the authentication module 106 for authentication of the user identifier to take place.

As previously described, the authentication module 106 authenticates the user using the received user identifier and password by comparing the received password with the password associated with the user identifier in the local user database 308 associated with the identified resource.

The provisioning adapter 312 then receives (410) the authentication status (either authenticated or not authenticated) from the authentication module 106 and sends (412) the authentication status back to the network resource 110. The network resource 110 then either grants or denies the user access to the resource accordingly.

In a further embodiment, the provisioning manager 304 and provisioning adapter 312 may be combined into a single element.

Figure 6:
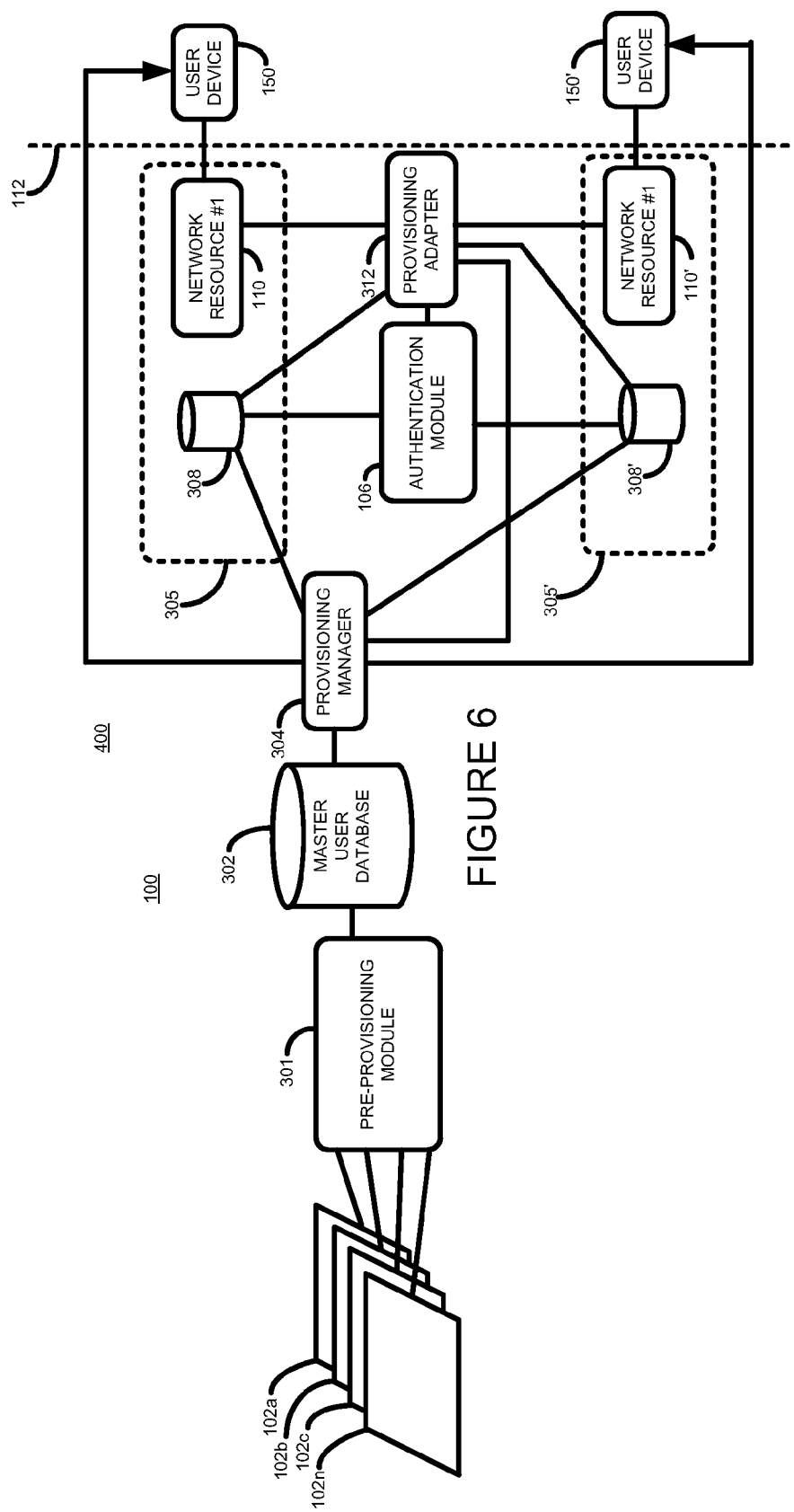
FIG. 6 is a block diagram showing a simplified block diagram of a system according to a further embodiment.
Figure 7:
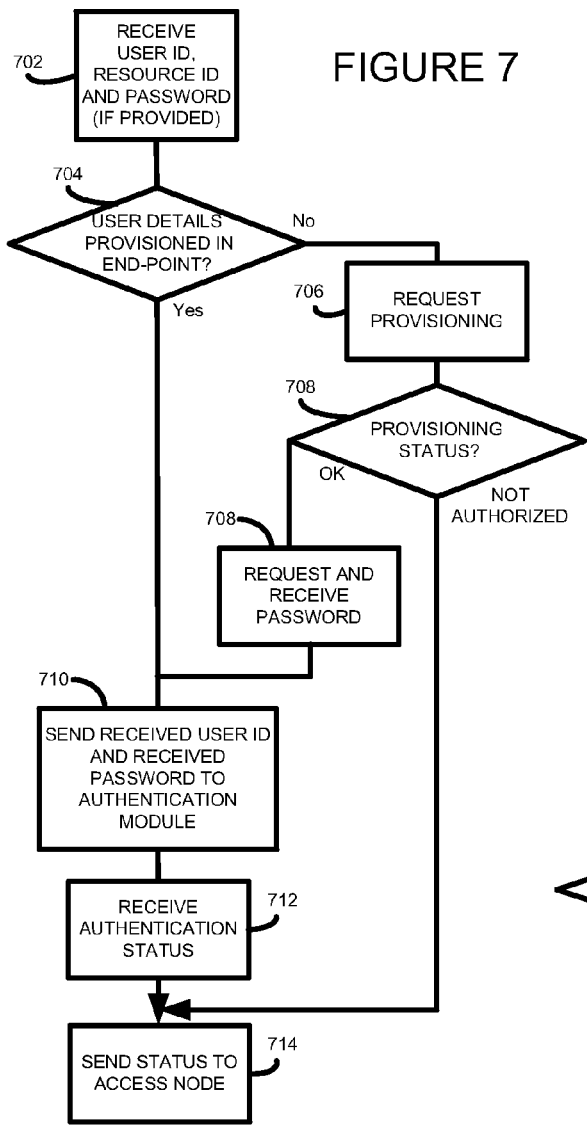
FIG. 7 is a flow diagram outlining an example method performed by a provisioning module according to a further embodiment of the present invention.
Figure 8:
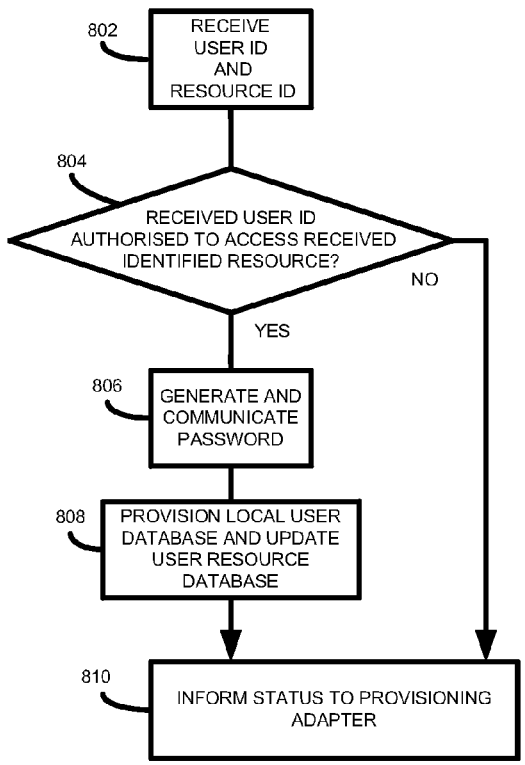
FIG. 8 is a flow diagram outlining an example method performed by a provisioning manager according to a further embodiment of the present invention.

Referring now to FIGS. 6, 7, and 8, is a shown a yet further embodiment.

In this embodiment, the provisioning adapter 312 is configured to directly communicate with each local user database. Thus, the provisioning adapter 312 itself determines (704) whether user details corresponding to the received user identifier are provisioned in the local user database 308. If the received user identifier is provisioned therein, the received user identifier and password are authenticated (710) and the status of the authentication returned (712, 714) to the network resource 110.

If the provisioning adapter 312 determines (704) that the user details corresponding to the received user identifier are not provisioned in the local user database 308 it requests (706) provisioning of the user details from the provisioning manager 304. The provisioning status is received (708) from the provisioning manager 304.

If the provisioning status indicates that the provisioning process was successful, the provisioning adapter 312 requests and receives (708) a password from the user of the user device 150, as previously described. The received password and received user identifier are then authenticated through the local user database 308 (710, 712, 714).

If provisioning of the user details was requested (706), the provisioning manager 304 receives (802) the user identifier and resource identifier from the provisioning adapter 312. The provisioning manager 304 then determines (804), through the master user database 302, whether the received user identifier is authorized to access the identified resource. If not, the provisioning manager 304 informs the provisioning adapter that the received user identifier is not authorized to access the resource. Otherwise, the provisioning manager 302 generates and communicates (806) a password to the identified user, provisions (808) the appropriate local user database, and informs the provisioning adapter that the provisioning step has been completed.

The present embodiments result in the master user database 302 containing user details of the whole user population authorized to access resources of the network 300. However, the local user databases 308 in each end-point only contain details of a smaller, active, subset of the whole user population.

Accordingly, in many circumstances the local user databases 308 do not need to be of the same capacity or have the same performance requirements as the master user database 302. Advantageously, this not only helps to reduce hardware, software, and maintenance costs, but also may significantly enhance performance. Furthermore, security may be increased by not having inactive user account details being stored at each end-point.

As users access network resources, over time the number user details stored in the local user databases in each end-point will increase, potentially reaching the number of user details stored in the main directory services database 102.

In order to keep the number user details stored in the local user database at a lower level, in a further embodiment a clean-up or de-provisioning process is periodically performed on the local user databases.

In one embodiment, the clean-up process deletes user details in each local user database that have not been accessed for a predetermined period of time. This may be determined, for example, by storing a timestamp in each local user database whenever a user accesses a resource, and by comparing the stored timestamp to a predetermined timestamp. Depending on the particular circumstances, the predetermined period of time may range from a number of days, a number of weeks, a number of months, or a number of years, etc.

When a user attempts to access a resource after their user details have been removed from the local user database this will result in the user details being re-provisioned, if applicable, in the local user database 308 by the provisioning manager 304, as described above, since their user details will no longer by stored in the local user database. In this embodiment, the only inconvenience to the user will be that they will be sent a new temporary password by the provisioning manager 304, as their previous password was not stored.

However, for users that access network resources only infrequently, there is a reasonable chance that they would not have remembered their previous password, and their request to access the network resources would likely have resulted in the user having to request, through an appropriate IT interface, either a password reminder or a new password to be generated. In any case, the inconvenience to the user is slight.

In a further embodiment, user details removed from a local user database may be archived for future retrieval. In this embodiment, the local user database can be configured to be a high performance database to ensure fast access and authentications, whereas the archived user details may be stored in a lower performance, but lower cost, archiving system. Such an arrangement may introduce a small time delay for a user whose user details were archived from accessing a network resource, since the user details will have to be retrieved from the archiving system.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed by a processor, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of controlling access to a network resource, comprising:
   receiving a request to access the network resource, the request including a user identifier;
   determining whether the received user identifier is stored in a local data store associated with the network resource; and where it is not so determined:
      determining, from user details stored in a master data store, whether the user is authorized to access the network resource; and where it is so determined:
         obtaining a password; and
         storing the obtained password and user details in the local data store associated with the network resource; and
   archiving from the local data store, user details of users who have not accessed the network resource for a predetermined period of time, and deleting those user details from the local data store.

2. The method of claim 1, wherein the user details comprise at least a user identifier.

3. The method of claim 1, wherein the step of determining whether the received user identifier is stored in the local data store is performed by interrogating the master data store.

4. The method of claim 1, wherein the step of determining whether the received user identifier is stored in the local data store is performed by interrogating the local data store associated with the network resource.

5. The method of claim 1, wherein the step of obtaining the password comprises generating a password.

6. The method of claim 5, further comprising communicating the generated password to the user.

7. The method of claim 1, further comprising receiving a password from the user, and authenticating the user using the received password and data stored in the local data store.

8. The method of claim 7, wherein authenticating the user is performed by verifying that the received password matches a password stored in association with the received user identifier data in the local data store associated with the resource.

9. The method of claim 7, wherein the request to access is received from the network resource, the method further comprising communicating the authentication status to the network resource.

10. The method of claim 1, further comprising:
    processing one or more user data sets to generate a consolidated master data set, each data set comprising one or more user details including user identifiers and corresponding resource identifiers identifying resources to which each user identifier is entitled to access; and
    storing the consolidated data set in the master data store.

11. Apparatus for controlling access to a network resource, comprising:
    a first module configured to receive a request from a network resource to grant access to a user, the request including a user identifier;
    the first module being further configured to request, from a second module, a provisioning status of the user identifier in a local user database associated with the network resource;
    the second module being configured to, upon receiving the provisioning status request, determine, from a master user database, whether the user identifier is stored in the local user database;
    the second module being further configured to, when it is determined that the user identifier is not stored in the local user database and where it is further determined from the master user database that the user identifier is authorized to access the network resource, to generate a password, to communicate the generated password to the user, and to store the generated password and user details in the local user database; and
    a data generation module configured to process one or more user data sets to generate a consolidated master data set, each data set comprising a one or more user identifiers and corresponding resource identifiers identifying resources to which each user identifier is entitled to access; and to store the generated consolidated data set in the master user data store.

12. The apparatus of claim 11, wherein the user details comprise at least a user identifier.

13. The apparatus of claim 11 wherein the first module is further configured to receive a password from the network resource and to authenticate the user using the received password and data stored in the local user database.

14. The apparatus of claim 13, wherein the first module is configured to authenticate the user by sending the received user identifier and password to an authentication module.

15. The apparatus of claim 11, wherein the second module is further configured to remove from the local user database user details of users from whom a request to grant access has not been received for a predetermined period of time.

16. A non-transitory computer readable medium having embodied thereon computer readable code which, when executed, performs a method of controlling access to a network resource, the method comprising:
    receiving a request to access to the network resource, the request including a user identifier;
    determining whether the received user identifier is stored in a local data store associated with the network resource; and where it is not so determined:
        determining, from user details stored in a master data store, whether the user is authorized to access the network resource; and where it is so determined:
        obtaining a password; and
        storing the obtained password and user details in the local data store associated with the network resource; and
    archiving from the local data store, user details of users who have not accessed the network resource for a predetermined period of time, and deleting those user details from the local data store.

17. A method of controlling access to a network resource, comprising:
    receiving a request to access to the network resource, the request including a user identifier;
    determining whether the received user identifier is stored in a local data store associated with the network resource; and where it is not so determined:
        determining, from user details stored in a master data store, whether the user is authorized to access the network resource; and where it is so determined:
        obtaining a password; and storing the obtained password and user details in the local data store associated with the network resource;

processing one or more user data sets to generate a consolidated master data set, each data set comprising one or more user details including user identifiers and corresponding resource identifiers identifying resources to which each user identifier is entitled to access; and storing the consolidated data set in the master data store.

* * * * *